United States Patent [19]
Yeager et al.

[11] Patent Number: 6,002,582
[45] Date of Patent: Dec. 14, 1999

[54] ADAPTER FOR VARIOUS LCD SIZES IN A COMPUTER

[75] Inventors: Susie Yeager; Andrew Moore, both of Austin, Tex.

[73] Assignee: Dell U.S.A., L.P., Round Rock, Tex.

[21] Appl. No.: 09/002,696

[22] Filed: Jan. 5, 1998

[51] Int. Cl.[6] .......................... H05K 5/00; G02F 1/1333; G02F 1/3338

[52] U.S. Cl. .......................... 361/681; 361/682; 345/905; 248/917

[58] Field of Search ................................... 361/683, 682, 361/681; 345/905; 248/917; 40/530

[56] References Cited

U.S. PATENT DOCUMENTS

| | | |
|---|---|---|
| 4,755,035 | 7/1988 | Kopish et al. |
| 4,772,100 | 9/1988 | Suenaga ................................... 350/336 |
| 5,002,368 | 3/1991 | Anglin ..................................... 350/334 |
| 5,146,354 | 9/1992 | Pleasinger ................................ 359/49 |
| 5,196,993 | 3/1993 | Herron et al. ........................... 361/393 |
| 5,264,992 | 11/1993 | Hogdahl et al. ........................ 367/681 |
| 5,268,816 | 12/1993 | Abell, Jr. et al. ....................... 361/729 |
| 5,272,601 | 12/1993 | McKillip .................................. 362/27 |
| 5,335,100 | 8/1994 | Obata ....................................... 359/49 |
| 5,363,227 | 11/1994 | Ichikawa et al. ........................ 359/83 |
| 5,422,751 | 6/1995 | Lewis et al. .............................. 359/83 |
| 5,479,285 | 12/1995 | Burke ........................................ 359/83 |
| 5,486,942 | 1/1996 | Ichikawa et al. ........................ 359/83 |
| 5,631,805 | 5/1997 | Bonsall .................................... 361/681 |
| 5,640,296 | 6/1997 | Bonsall et al. ........................... 361/681 |
| 5,729,250 | 3/1998 | Bishop et al. ........................... 345/175 |
| 5,850,333 | 12/1998 | Owanesian et al. .................... 361/704 |

FOREIGN PATENT DOCUMENTS

| | | | |
|---|---|---|---|
| 401237519 | 9/1989 | Japan | G02F 1/133 |
| 3-173198 | 7/1991 | Japan | H05K 7/14 |
| 5-150224 | 6/1993 | Japan | G06F 1/16 |
| 2234128 | 1/1991 | United Kingdom | H03J 1/04 |

*Primary Examiner*—Leo P. Picard
*Assistant Examiner*—Anatoly Vortman
*Attorney, Agent, or Firm*—Hanes & Boone, L.L.P.

[57] ABSTRACT

An LCD adapter mounting for a computer cover includes a cover base and an adapter mounted in the base. An LCD panel is mounted in the adapter. The adapter is mounted in the cover base in a first orientation when the LCD panel is of a first size. The adapter is mounted in the cover base in a second orientation, inverted from the first orientation, when the LCD panel is of a second size. A bezel is mounted on the cover base for securing the adapter and LCD panel therebetween.

20 Claims, 7 Drawing Sheets

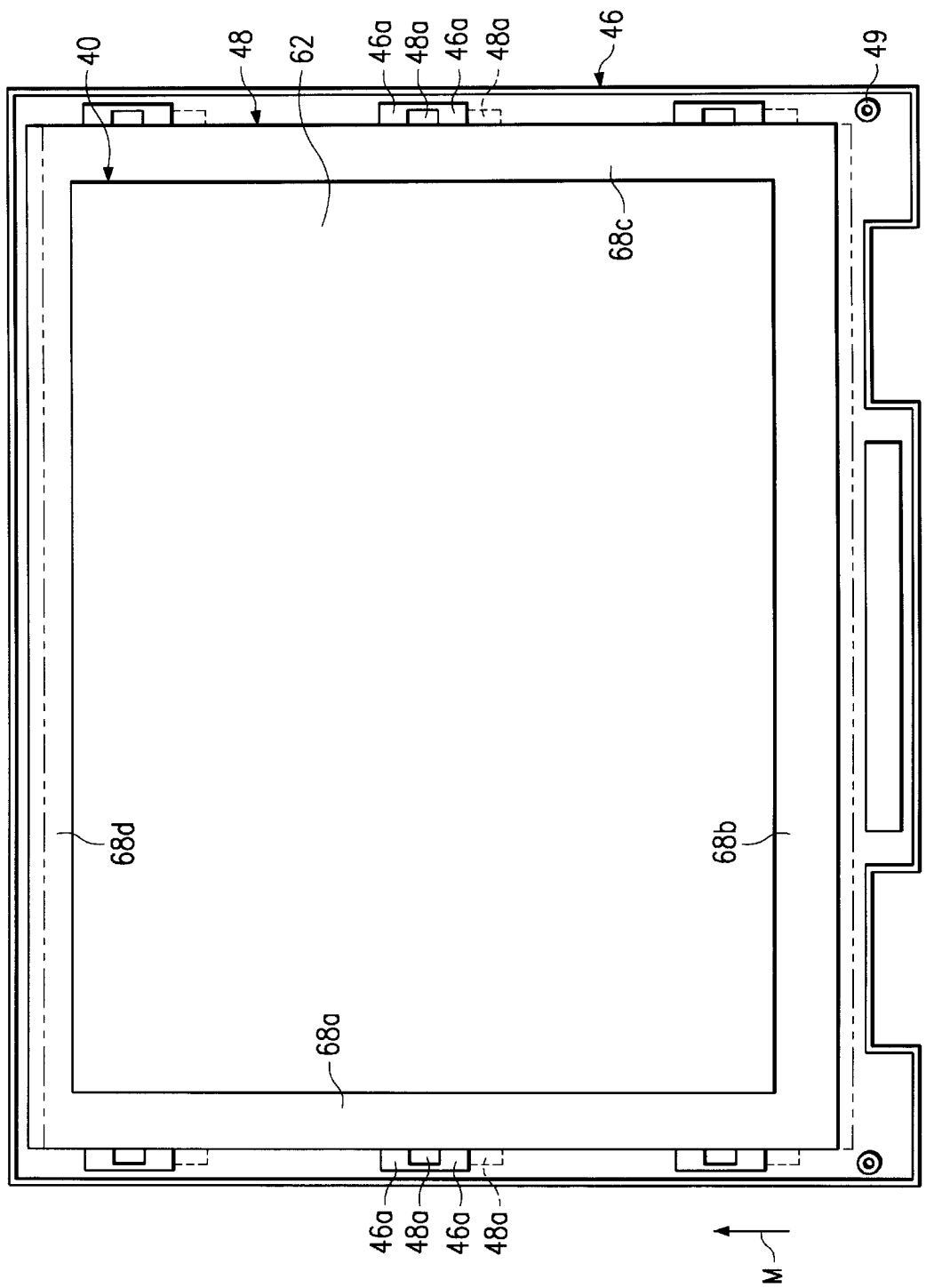

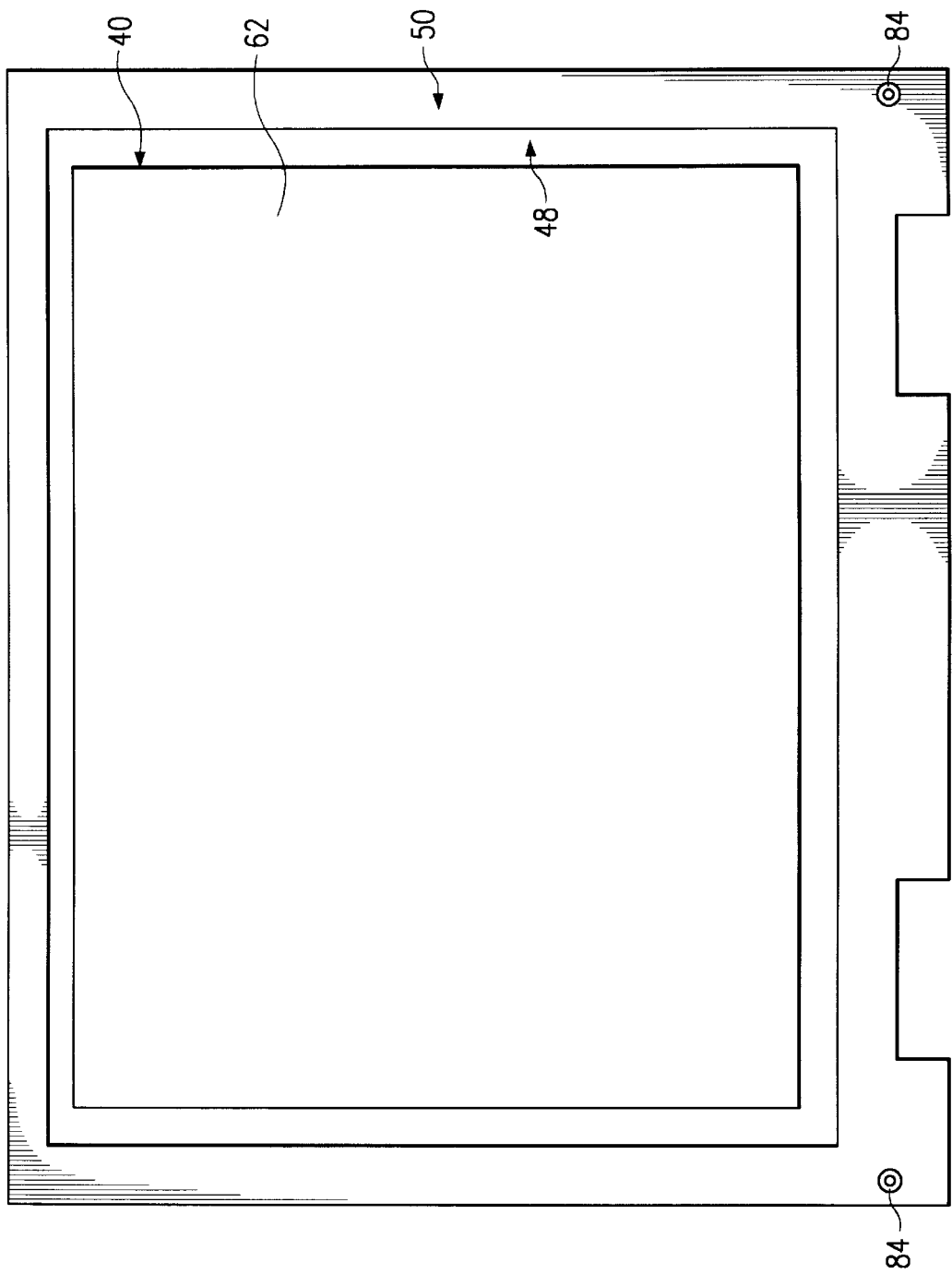

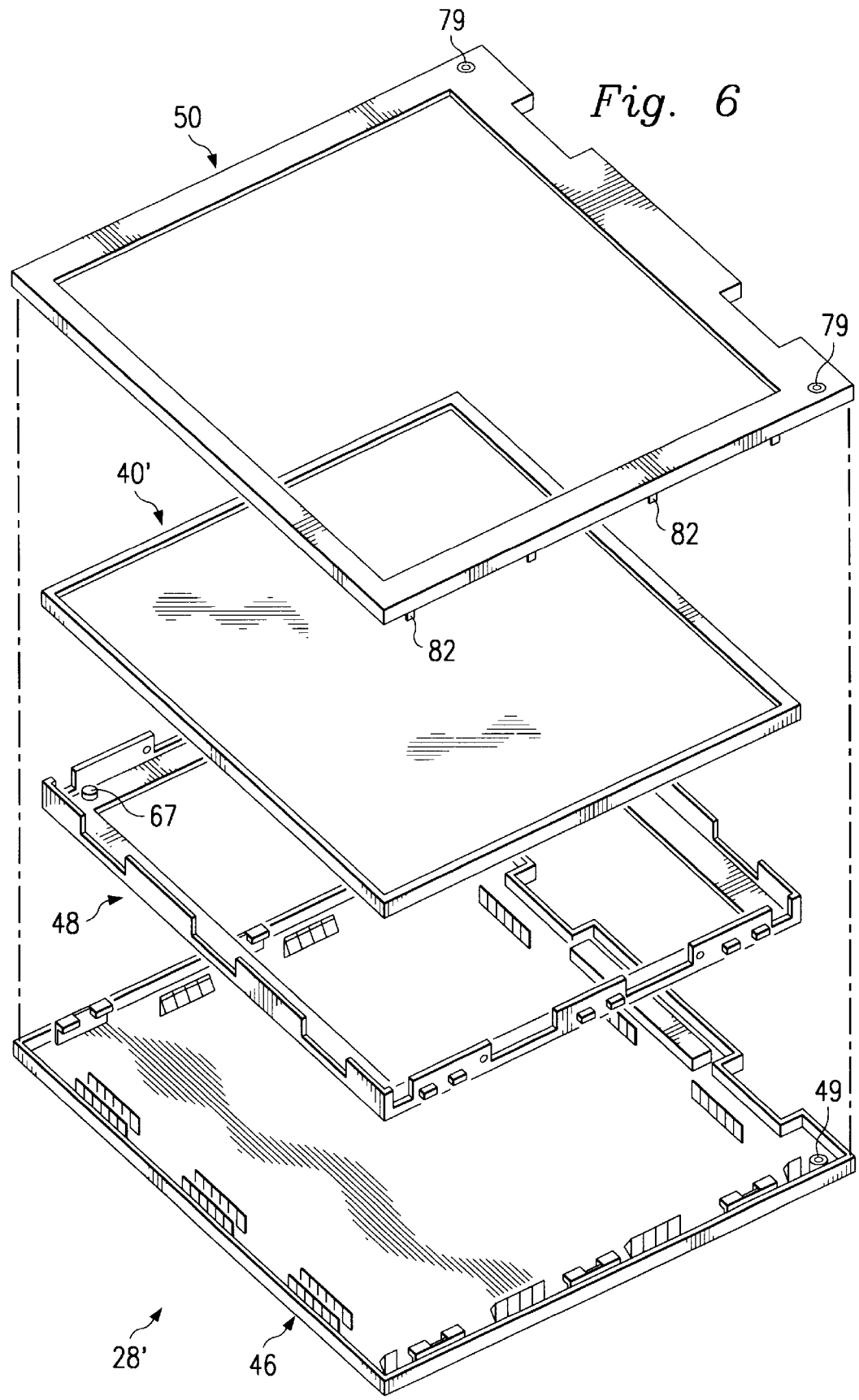

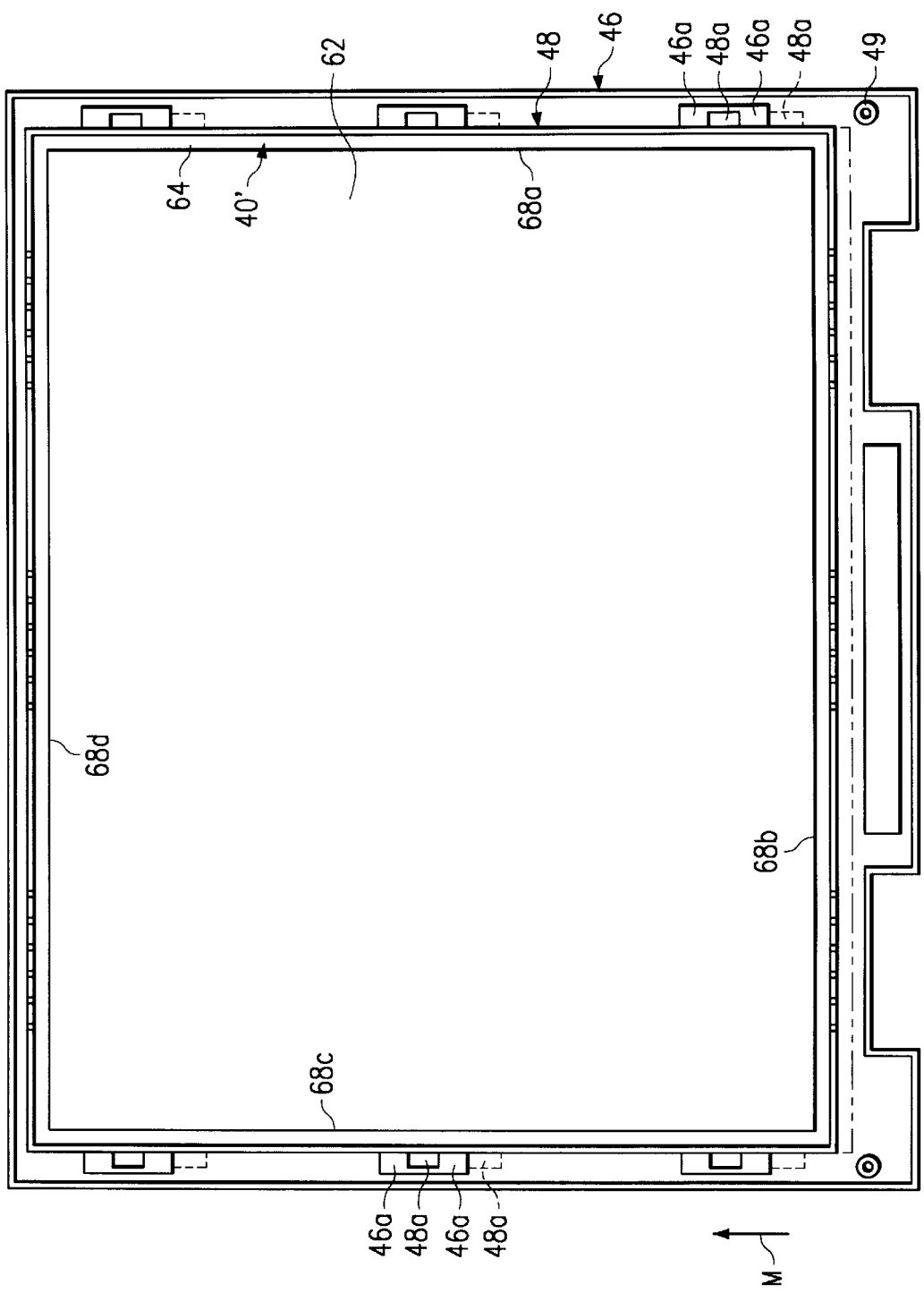

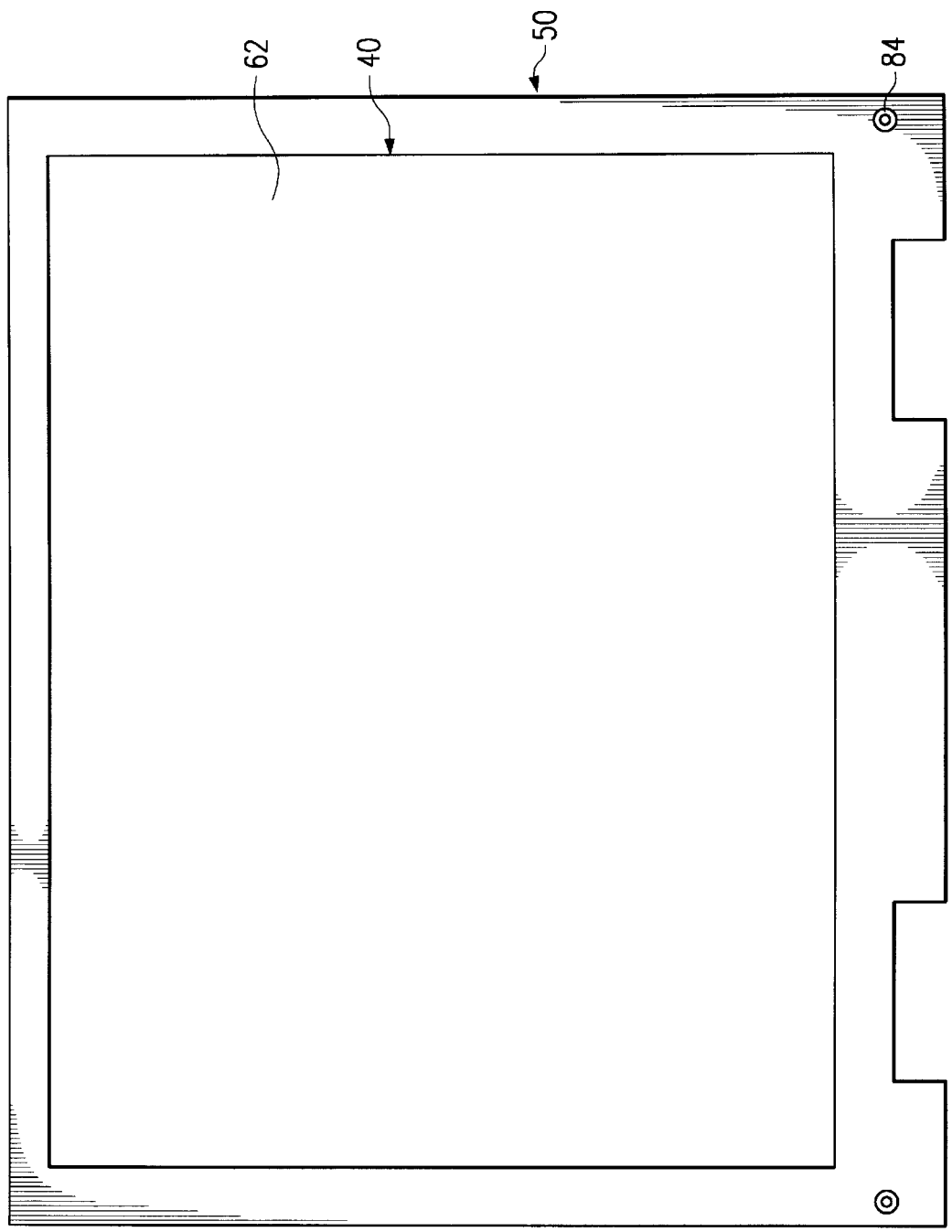

ADAPTER FOR VARIOUS LCD SIZES IN A COMPUTER

BACKGROUND

The disclosures herein relate generally to portable computer systems and more particularly to an adapter for mounting an LCD panel in a laptop computer.

Portable laptop or notebook computers include a base and a cover which is pivotally connected to the base at a hinged connection. When the cover is raised, a liquid crystal display (LCD) panel mounted therein is exposed. The LCD panels are costly components available from several manufacturing sources and are available in various sizes. In addition, the spacing and orientation of the mounting points for one manufacturer may vary from the spacing and orientation of the mounting points for another manufacturer. As a result, several different cover configurations are required for mounting the various size LCD panels and their multiple mounting points.

LCD panels are mounted between a cover base and a bezel. Various size LCD panels have different "active" areas, i.e. the area of the panel that becomes illuminated and is visible. As a result, the bezel used must cover the peripheral edges of the LCD panel in a manner which exposes only the active area for a particular panel. Because of the variation in panel sizes and active areas, it is difficult to provide a one size fits all bezel for all panels. Moreover, it is also difficult to provide apparatus and methods for securely mounting LCD panels in a cover base by accommodating the various sizes of panels and the various mounting point locations. As a result, costly additional parts are required to accommodate each different panel size and each different mounting point configuration to adapt the LCD panel to the cover and bezel with which a particular panel is being used.

Therefore, what is needed is an apparatus and a method for mounting various size LCD panels having varying mounting point locations by using a single cover base configuration and a single bezel configuration.

SUMMARY

One embodiment, accordingly provides an apparatus and a method for providing LCD panels of various sizes to be mounted in a portable computer cover by using a single cover base and a single bezel. To this end, an LCD adapter mounting is provided for a computer cover. An invertible adapter is mounted in a cover base in a first orientation for securing a first size LCD panel therein. The adapter is mounted in a second orientation, inverted from the first orientation, for securing a second size LCD panel therein. A bezel is mounted on the cover base for securing the adapter between the bezel and cover base.

A principal advantage of this embodiment is that various size LCD panels having various mounting point locations and different size active areas, can be mounted in a cover by using an invertible adapter with a single cover base configuration and a single bezel configuration.

BRIEF DESCRIPTION OF THE DRAWINGS

FIG. 4 is a plan view illustrating an embodiment of an adapter and an LCD panel mounted in a cover base.

FIG. 5 is a plan view illustrating an embodiment of a bezel mounted on the embodiment of FIG. 4.

FIG. 6 is an exploded view illustrating an embodiment of components of a notebook computer cover having the adapter inverted from the embodiment of FIG. 3.

FIG. 7 is a plan view illustrating an embodiment of the adapter mounted in the cover base inverted from the embodiment of FIG. 4.

FIG. 8 is a plan view illustrating an embodiment of the bezel mounted on the embodiment of FIG. 7.

DETAILED DESCRIPTION OF THE PREFERRED EMBODIMENT

Figure 1:
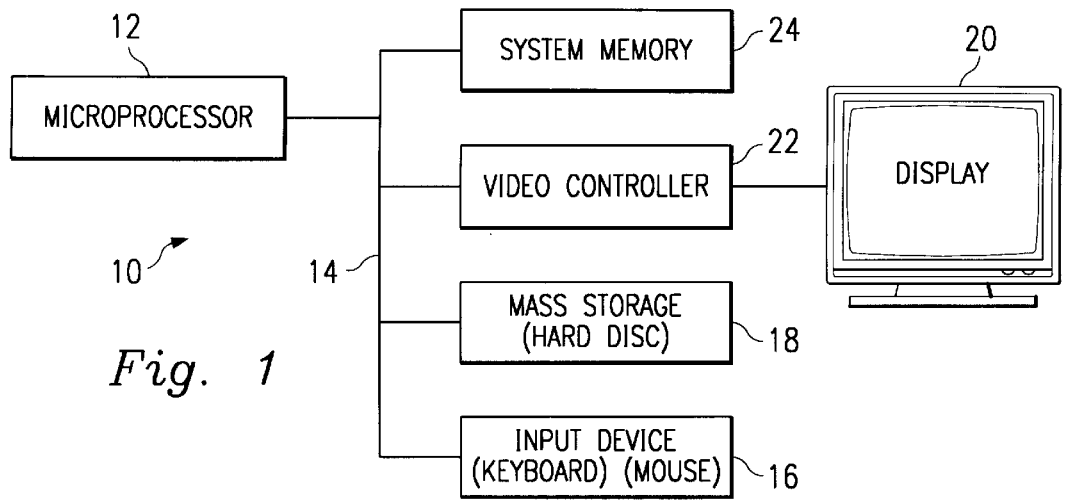
FIG. 1 is a diagrammatic view illustrating an embodiment of a typical computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 10 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
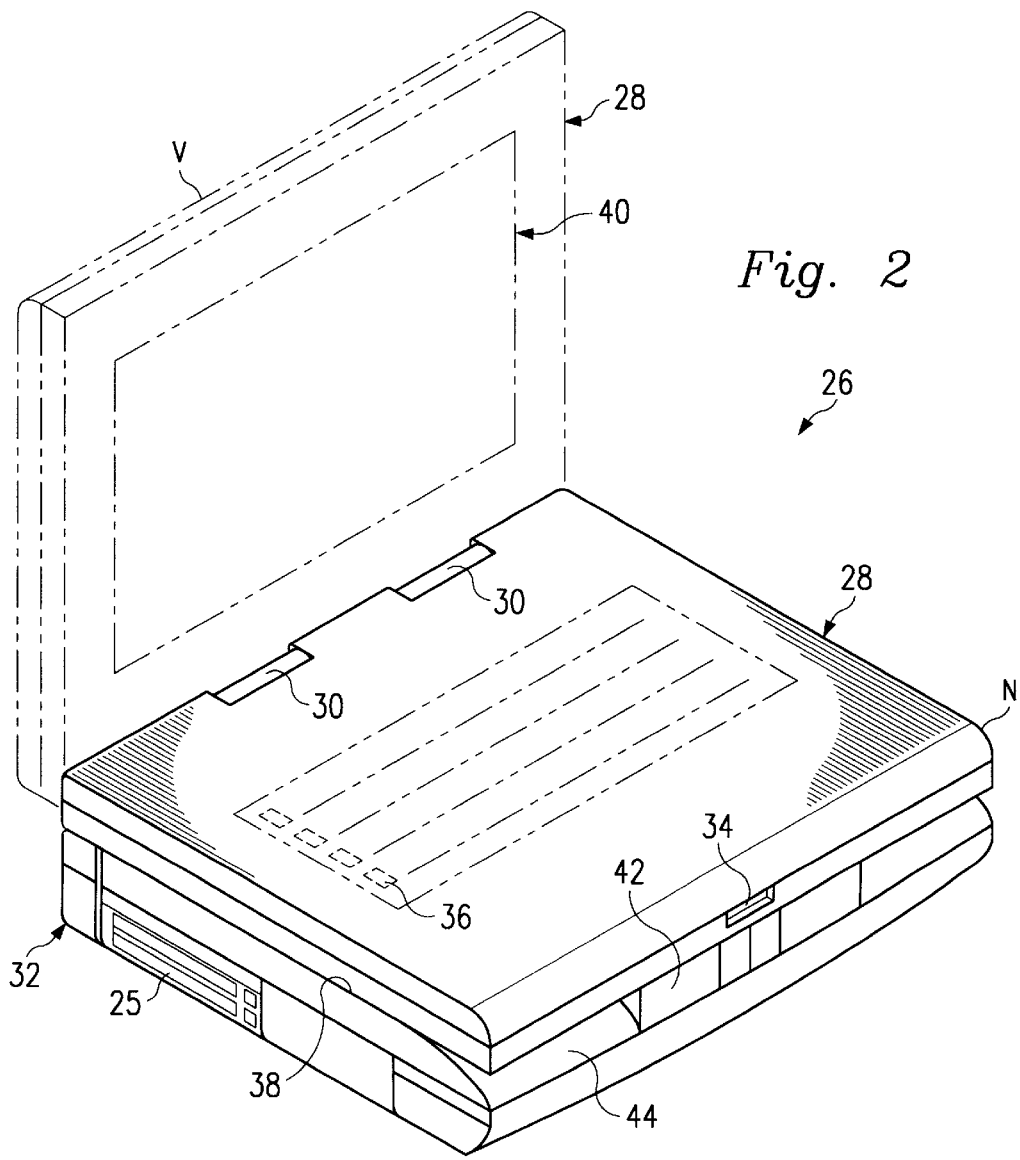
FIG. 2 is a perspective view illustrating an embodiment of a typical portable notebook computer.

Referring to FIG. 2, illustrated is a portable, notebook size computer designated 26 comprising self-contained computer system 10, described above, and including a hinged top or cover 28 rotatable about a pair of hinges 30 from a nested position "N", with a horizontal base 32, to a substantially vertical or open position "V". Opening of the notebook style portable computer by manipulation of a latch 34, reveals a plurality keys 36, illustrated in phantom outline, on a horizontal keyboard surface 38 of base 32, and an LCD display panel 40 in an exposed portion of cover 28. Computer 26 also includes a plurality external ports, an exemplary one of which is designated 25. Base 32 may also include a pointing device 42, such as a track pad, track ball or the like. A palm rest surface 44 is commonly provided adjacent keyboard surface 38.

Figure 3:
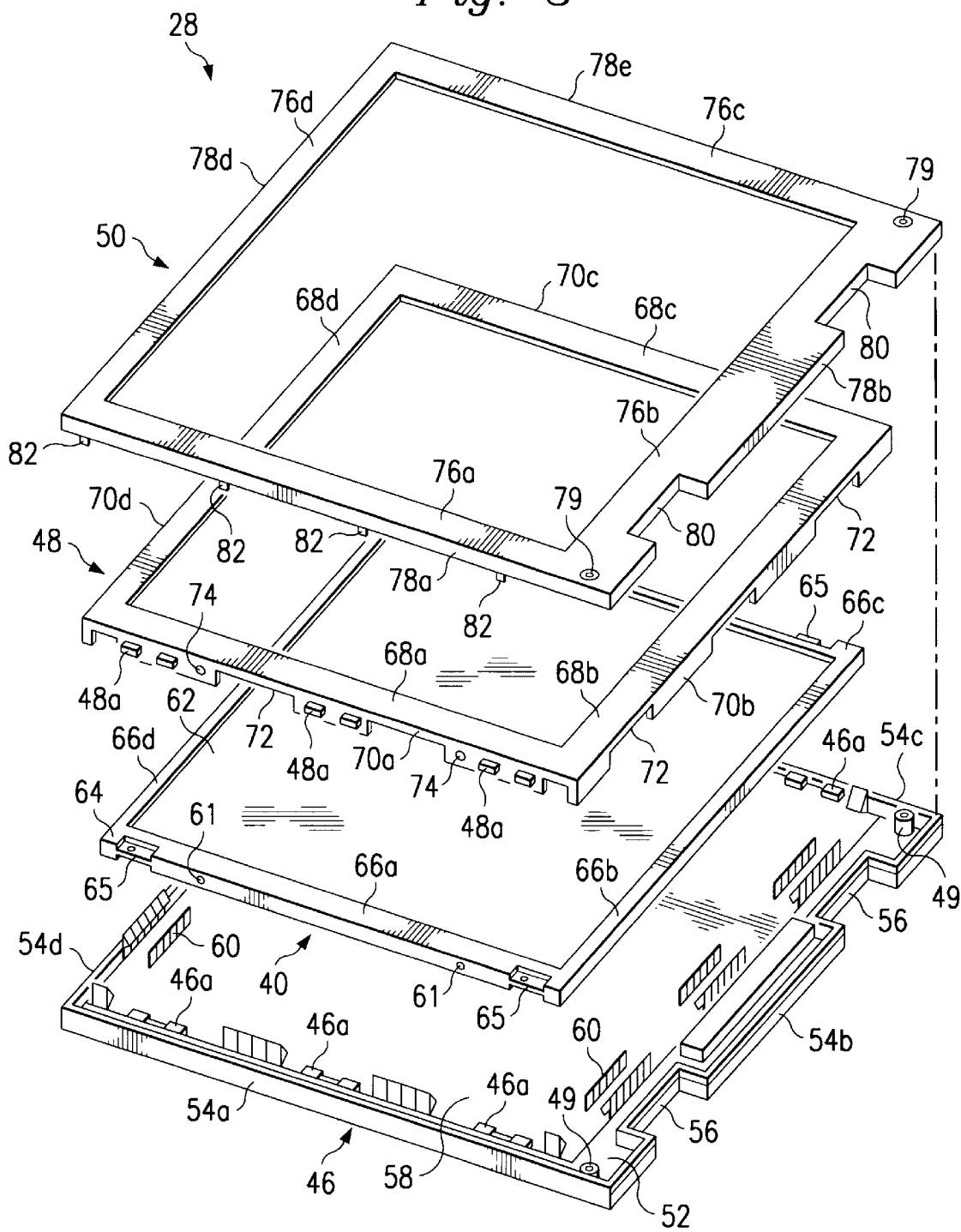
FIG. 3 is an exploded view illustrating an embodiment of components of a notebook computer cover.

More specifically, cover 28, FIG. 3, includes a cover base 46, LCD panel 40, an adapter 48 and a bezel 50. Cover base 46 is generally rectangular and includes a planar back panel 52 and peripheral edges 54a, 54b, 54c and 54d extending in a direction perpendicular to back panel 52. Cutout portions 56 provide a recess for hinges 30 not shown in FIG. 3. An EMI shielding plate 58 is supported on back panel 52 and includes a plurality of spring fingers 60 for contact with LCD panel 40, in the known manner. A plurality of pairs of spaced apart tabs 46a extend inwardly from opposite edges 54a and 54c. A pair standoffs 49 extend in a direction perpendicular to back panel 52.

LCD panel 40 is generally rectangular and includes an active area 62 which becomes illuminated during use. Active area 62 is bounded by a metal band 64 on each peripheral edge 66a, 66b, 66c, 66d, of panel 40. Top mounting points 65 are provided in edges 66a, 66c and are matched to mounting points 67, only one of which is illustrated in FIG.

6, provided on an underside of adapter 48. EMI grounding occurs when, in assembled form, metal band 64 is engaged by fingers 60. A plurality of side mounting points 61, FIG. 3, are provided in edges 66a, 66c, but are not fully visible in edge 66c.

Adapter 48 is generally rectangular and is in the form of a picture frame. Adapter 48 includes a frame portion comprising four sides 68a, 68b, 68c, 68d and four corresponding perpendicular edges 70a, 70b, 70c, 70d. A plurality of pairs of spaced apart tabs 48a extend outwardly from opposite edges 70a, 70c, but are not visible on edge 70c, FIG. 3. Cutout portions 72 illustrated in edges 70a, 70b and not fully visible in edges 70c, 70d, FIG. 3, are included for permitting fingers 60 to contact metal band 64 when LCD panel 40 is mounted in adapter 48, Also, a plurality of side mounting points 74 are provided in edges 70a, 70c, but are not visible in edge 70c, FIG. 3.

Bezel 50 is also generally rectangular and is in the form of a picture frame. Bezel 50 includes a frame portion comprising four sides 76a, 76b, 76c, 76d and four corresponding perpendicular edges 78a, 78b, 78c, 78d. Also, edge 78b includes a pair of mounting apertures 79 matched to align with standoffs 49 of cover base 46, and a pair of cutout portions 80 matched to correspond with cutout portions 56 of cover base 46. A plurality of tabs 82, illustrated as extending from edge 76a, also extend from edge 76c, for engagement with cover base 46.

When assembled, FIG. 4, sides 68a, 68b, 68c, 68d of adapter 48 conceal metal band 64 of LCD panel 40 and expose only the active area 62. Fasteners, not shown, extended through mounting points 65, 67, FIGS. 3 and 6, secure LCD panel 40 in adapter 48. The adapter 48 and LCD panel 40, FIG. 4, acre mounted in cover base 46 and secured therein due to tabs 48a of adapter 48 slidingly urged in a direction indicated by an arrow designated M under tabs 46a of cover base 46. Bezel 50, FIG. 5, is then secured to cover base 46 by means of a pair of fasteners 84, extended through apertures 79, and into standoffs 49, FIG. 3. Tabs 82, FIG. 3, are also engaged with cover base 46. As a result, bezel 50, FIG. 5, frames a portion of adapter 48, which in turn, frames active area 62 of LCD panel 40. The framing effect of adapter 48 and bezel 50 combine to assure that in smaller dimension LCD panels 40, metal band 64 will be covered and only active area 62 will be exposed.

In another embodiment, FIG. 6, an LCD panel $40^1$ is of a larger outside dimension than LCD panel 40 of FIG. 3. In such a case, adapter 48 is used in an inverted position relative to the position illustrated in FIG. 3, so that, cover $28^1$, includes cover base 46, inverted adapter 48, LCD panel $40^1$ and bezel 50.

When assembled, FIG. 7, sides 68a, 68b, 68c, 68d of adapter 48 support LCD panel $40^1$ and expose metal band 64 and active area 62. Fasteners, not shown, extended through side mounting points 61, 74, FIG. 3, secure LCD panel $40^1$ in adapter 48. The adapter 48 and LCD panel $40^1$, FIG. 7, are mounted in cover base 46 and secured therein due to tabs 48a of adapter 48 slidingly urged in the direction indicated by the arrow designated M under tabs 46a of cover base 46. Bezel 50, FIG. 8, is then secured to cover base 46 by means of fasteners 84, extended through apertures 79, and into standoffs 49, FIG. 6. Tabs 82, FIG. 6, are also engaged with cover base 46. As a result, bezel 50, FIG. 8, frames active area 62 of LCD panel 40. The framing effect of bezel 50 is sufficient to cover metal band 64 and expose only active area 62 of larger dimension LCD panel $40^1$.

Other sets of mounting points (not shown) are provided in adapter 48 to accommodate, not only other size LCD panels, but LCD panels from various manufacturers having various mounting points in different orientations. In this manner, adapter 48 can accommodate a wide range of LCD panels of different sizes and from different manufacturers. With regard to mounting the adapter 48 in the cover base 46, it is also possible to replace tabs 48a with notches formed to extend into adapter 48, positioned to receive tabs 46a of cover base 46.

As it can be seen, the principal advantage of these embodiments is that a single adapter can be used in a first orientation, or a second inverted orientation, to mount various size LCD panels having various mounting point locations and different size active areas, in a single cover base configuration and a simple bezel configuration.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An LCD adapter mounting for a computer cover comprising:
   a cover base;
   an invertible adapter, the adapter being mounted in the cover base in a first orientation for securing a first size LCD panel therein, and being mounted in the cover base in a second orientation, inverted from the first orientation, for securing a second size LCD panel therein; and
   a bezel mounted on the cover base for securing the adapter therebetween.

2. The apparatus as defined in claim 1 wherein the cover base includes a plurality of tabs extending inwardly from opposite sides thereof.

3. The apparatus as defined in claim 2 wherein the adapter includes a plurality of tabs extending outwardly from opposite edges thereof.

4. The apparatus as defined in claim 3 wherein the tabs of the cover base are positioned for engagement with the tabs of the adapter when the adapter is in either of the first and second orientations.

5. The apparatus as defined in claim 1 wherein the adapter includes a plurality of mounting points formed therein.

6. The apparatus as defined in claim 5 wherein the mounting points include top mounting points and side mounting points.

7. An LCD adapter mounting for a computer cover comprising:
   a cover base;
   an invertible adapter;
   an LCD panel mounted in the adapter, the adapter being mounted in the cover base in a first orientation when the LCD panel is of a first size, the adapter being mounted in the cover base in a second orientation, inverted from the first orientation, when the LCD panel is of a second size; and
   a bezel mounted on the cover base for securing the adapter and LCD panel therebetween.

8. The apparatus as defined in claim 7 wherein the adapter, in the first orientation, includes a frame portion covering an inactive portion of the LCD panel.

9. The apparatus as defined in claim 8 wherein the bezel is mounted in abutment with the frame portion of the adapter.

10. The apparatus as defined in claim 7 wherein the cover base includes a plurality of tabs extending inwardly from opposite sides thereof.

11. The apparatus as defined in claim 10 wherein the adapter includes a plurality of tabs extending outwardly from opposite side edges thereof.

12. The apparatus as defined in claim 11 wherein the tabs of the adapter slidably engage the tabs of the cover.

13. The apparatus as defined in claim 7 wherein the adapter includes a plurality of mounting points formed therein.

14. The apparatus as defined in claim 13 wherein the mounting points include top mounting points and side mounting points.

15. A computer system comprising:
- at least one microprocessor;
- at least one input coupled to provide input to the microprocessor;
- at least one mass storage coupled to the microprocessor;
- at least one display coupled to the microprocessor by a video controller;
- at least one memory coupled to provide storage to facilitate execution of computer programs by the microprocessor;
- a cover including a base;
- an invertible adapter, the adapter being mounted in the cover base in a first orientation for securing a first size LCD panel therein, and being mounted in the cover base in a second orientation, inverted from the first orientation, for securing a second size LCD panel therein; and
- a bezel mounted on the cover base for securing the adapter therebetween.

16. The system as defined in claim 15 wherein the adapter, in the first orientation, includes a frame portion in abuttment with the bezel.

17. The system as defined in claim 16 wherein the adapter, in the second orientation, includes a frame portion adjacent the cover base.

18. The system as defined in claim 15 wherein a plurality of inwardly extending tabs on the cover base slidably engage a plurality of outwardly extending tabs on the adapter for securing the adapter in the cover base.

19. A method of securing various size LCD panels in a computer cover base comprising the steps of:
- mounting an LCD panel in an invertible adapter;
- inserting the adapter in the cover base in a first orientation when the LCD panel is of a first size;
- inserting the adapter in the cover base in a second orientation, inverted from the first orientation, when the LCD panel is of a second size; and
- mounting a bezel on the cover base for securing the adapter and LCD panel therebetween.

20. The method as defined in claim 19 wherein the step of inserting the adapter in the cover base comprises the step of sliding the adapter relative to the cover base so that tabs on the adapter engage tabs on the cover base.

* * * * *